(12) United States Patent
Hirata et al.

(10) Patent No.: US 12,332,534 B2
(45) Date of Patent: Jun. 17, 2025

(54) OPTICAL WAVEGUIDE DEVICE, OPTICAL MODULATOR, OPTICAL MODULATION MODULE, AND OPTICAL TRANSMISSION APPARATUS

(71) Applicant: SUMITOMO OSAKA CEMENT CO., LTD., Tokyo (JP)

(72) Inventors: Shotaro Hirata, Tokyo (JP); Masayuki Motoya, Tokyo (JP); Kosuke Okahashi, Tokyo (JP); Yu Kataoka, Tokyo (JP); Shingo Takano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 402 days.

(21) Appl. No.: 17/827,035

(22) Filed: May 27, 2022

(65) Prior Publication Data
US 2022/0382119 A1 Dec. 1, 2022

(30) Foreign Application Priority Data
May 28, 2021 (JP) .................................. 2021-089824

(51) Int. Cl.
| | |
|---|---|
| *G02F 1/225* | (2006.01) |
| *G02F 1/01* | (2006.01) |
| *G02F 1/03* | (2006.01) |
| *G02F 1/035* | (2006.01) |
| *G02F 1/21* | (2006.01) |

(52) U.S. Cl.
CPC ............ *G02F 1/225* (2013.01); *G02F 1/0113* (2021.01); *G02F 1/0316* (2013.01); *G02F 1/035* (2013.01); *G02F 1/212* (2021.01); *G02F 2201/127* (2013.01); *G02F 2202/16* (2013.01)

(58) Field of Classification Search
CPC ........ G02F 1/0113; G02F 1/035; G02F 1/212; G02F 1/225; H04B 10/516
See application file for complete search history.

(56) References Cited

U.S. PATENT DOCUMENTS

| | | | | |
|---|---|---|---|---|
| 6,068,781 A | * | 5/2000 | Tsuruma | ................. G02F 1/035 216/13 |
| 7,310,453 B2 | * | 12/2007 | Ichikawa | ................ G02F 1/225 385/2 |
| 9,304,370 B2 | * | 4/2016 | Kondou | ................. G02B 6/125 |

(Continued)

FOREIGN PATENT DOCUMENTS

| | | |
|---|---|---|
| JP | H10-104667 A | 4/1998 |
| JP | 2007-264548 | 10/2007 |

(Continued)

*Primary Examiner* — Daniel Petkovsek
(74) *Attorney, Agent, or Firm* — Rankin, Hill & Clark LLP

(57) ABSTRACT

There is provided an optical waveguide device including a substrate, an optical waveguide formed on the substrate, and a working electrode that controls a light wave propagating through the optical waveguide, in which the working electrode includes a first base layer made of a first material, and a first conductive layer on the first base layer, and a conductor pattern including a second base layer made of a second material different from the first material and a second conductive layer on the second base layer is formed in a region other than a path from an input end to an output end of the optical waveguide, in a region on the substrate.

21 Claims, 12 Drawing Sheets

(56) References Cited

U.S. PATENT DOCUMENTS

| | | | |
|---|---|---|---|
| 10,416,526 B2 * | 9/2019 | Kondou | G02F 1/2255 |
| 10,895,765 B2 * | 1/2021 | Fujino | G02F 1/035 |
| 11,977,284 B2 * | 5/2024 | Motoya | G02F 1/212 |
| 2022/0163720 A1 * | 5/2022 | Kugimoto | G02F 1/0356 |

FOREIGN PATENT DOCUMENTS

| | | |
|---|---|---|
| JP | 2015-197454 A | 11/2015 |
| JP | 2018-128633 A | 8/2018 |
| JP | 2020-164627 | 10/2020 |
| JP | 2022-182321 A | 12/2022 |
| WO | 2018/031916 | 2/2018 |

* cited by examiner

III-III CROSS-SECTIONAL VIEW

IV-IV CROSS-SECTIONAL VIEW

III-III CROSS-SECTIONAL VIEW

III-III CROSS-SECTIONAL VIEW

OPTICAL WAVEGUIDE DEVICE, OPTICAL MODULATOR, OPTICAL MODULATION MODULE, AND OPTICAL TRANSMISSION APPARATUS

CROSS-REFERENCE TO RELATED APPLICATIONS

This application claims the benefit of Japanese Patent Application No. 2021-089824 filed May 28, 2021, the disclosure of which is herein incorporated by reference in its entirety.

BACKGROUND OF THE INVENTION

Field of the Invention

The present invention relates to an optical waveguide device, an optical modulator, an optical modulation module, and an optical transmission apparatus.

Description of Related Art

In a commercial optical fiber communication system, an optical modulator incorporating an optical modulation element as an optical waveguide device including an optical waveguide formed on a substrate and a working electrode for controlling a light wave by acting an electric field on the optical waveguide is often used. Among the optical modulation elements, an optical modulation element using $LiNbO_3$ (hereinafter, also referred to as LN) having an electro-optic effect for a substrate can achieve high-frequency optical modulation characteristics with less optical loss, so that it is widely used in optical fiber communication systems for high-frequency, large-capacity backbone optical transmission networks and metro networks.

As one measure for miniaturization, high-frequency, and power saving of such optical modulation elements, an optical modulator in which an LN substrate is thinned to strengthen an interaction between a signal electric field and a waveguide light in the substrate (that is, to increase electric field efficiency), or an optical modulator using a rib-type optical waveguide or a ridge optical waveguide (hereinafter, collectively referred to as a protruding optical waveguide) configured by forming a band-shaped protruding portion on a surface of the LN substrate is also being put into practical use (for example, Japanese Laid-open Patent Publication No. 2007-264548 and Pamphlet of International Publication No. WO 2018/031916).

Recently, it has also been proposed that a base layer of a working electrode of applying an electric field to an optical waveguide is configured by using a metal material having a smaller light absorption coefficient at an operating optical wavelength (Japanese Patent Application No. 2020-164627). Thus, it is possible to prevent light propagating in the optical waveguide from being absorbed by the metal of the base layer of the working electrode provided to be close to the optical waveguide and causing a light absorption loss. That is, with this configuration, it is possible to achieve a low-loss optical waveguide device while reducing a light absorption loss in the optical waveguide.

On the other hand, so-called unnecessary light that is controlled by the working electrode and does not contribute to output light output from the optical waveguide to an outside of the substrate can also propagate to the substrate of the optical waveguide device. For example, leaked light leaked into the substrate from a light input portion, a branching part, and/or a Y-branch coupler in the optical waveguide can become the unnecessary light and propagate in the substrate. Depending on a route of the optical waveguide on the substrate, such unnecessary light is recombined with waveguide light propagating in the optical waveguide to cause a noise in the output light.

SUMMARY OF THE INVENTION

From the background described above, it is desired to achieve an optical waveguide device having a structure capable of effectively removing unnecessary light propagating in a substrate while suppressing a light absorption loss caused by a working electrode.

According to one aspect of the present invention, there is provided an optical waveguide device including a substrate, an optical waveguide formed on the substrate, and a working electrode that controls a light wave propagating through the optical waveguide, in which the working electrode includes a first base layer made of a first material, and a first conductive layer on the first base layer, and a conductor pattern including a second base layer made of a second material different from the first material and a second conductive layer on the second base layer is formed in a region other than a path from an input end to an output end of the optical waveguide, in a region on the substrate.

According to still another aspect of the present invention, the conductor pattern including the second base layer and the second conductive layer may be formed in a region in which unnecessary light propagates, in the region on the substrate.

According to still another aspect of the present invention, the second material may have a light absorption coefficient at a wavelength of light propagating through the optical waveguide, which is larger than a light absorption coefficient of the first material at the wavelength of the light.

According to still another aspect of the present invention, the conductor pattern may be a pattern continuous from a wiring electrode connected to the working electrode.

According to still another aspect of the present invention, the optical waveguide may include a Mach-Zehnder type optical waveguide, a radiated light beam waveguide that propagates radiated light leaked from the Mach-Zehnder type optical waveguide may be provided at a Y-branch coupler of the Mach-Zehnder type optical waveguide, and the conductor pattern may be disposed to cover at least a part of the radiated light beam waveguide.

According to still another aspect of the present invention, the first conductive layer and the second conductive layer may be made of gold (Au), and the first material and the second material may include a material that does not react with iodine.

According to still another aspect of the present invention, the first material may be niobium (Nb) and the second material may be titanium (Ti).

According to still another aspect of the present invention, a thickness of the first base layer may be equal to or lower than 30 nm, and a thickness of the second base layer may be equal to or higher than 100 nm.

According to still another aspect of the present invention, the optical waveguide may be a protruding optical waveguide including a protruding portion extending on the substrate.

According to still another aspect of the present invention, two working electrodes sandwiching the optical waveguide in a plane of the substrate may be provided, and a gap of the two working electrodes may be equal to or higher than 1.0 µm and equal to or lower than 5.0 µm.

According to still another aspect of the present invention, the working electrode may have a third base layer made of a third material different from the first material and a third conductive layer, on the first base layer, and an end portion of the third base layer may be covered with the third conductive layer, in a cross-section perpendicular to an extending direction of the optical waveguide.

According to still another aspect of the present invention, the third material may be made of titanium (Ti), and the third conductive layer may be made of gold (Au).

According to still another aspect of the present invention, there is provided an optical modulator including: any of the optical waveguide devices, which is an optical modulation element that modulates light; a case that houses the optical waveguide device; an optical fiber through which light is input to the optical waveguide device; and another optical fiber that guides light output by the optical waveguide device to an outside of the case.

According to still another aspect of the present invention, there is provided an optical modulation module including: any of the optical waveguide devices, which is an optical modulation element that modulates light; a case that houses the optical waveguide device; an optical fiber through which light is input to the optical waveguide device; another optical fiber that guides light output by the optical waveguide device to an outside of the case; and a drive circuit that drives the optical waveguide device.

According to still another aspect of the present invention, there is provided an optical transmission apparatus including: the optical modulator or the optical modulation module; and an electronic circuit that generates an electrical signal for causing the optical waveguide device to perform a modulation operation.

According to the present invention, there is provided an optical waveguide device capable of effectively removing unnecessary light propagating in a substrate while suppressing a light absorption loss caused by a working electrode.

DETAILED DESCRIPTION OF THE INVENTION

Hereinafter, embodiments of the present invention will be described with reference to the drawings.

First Embodiment

Figure 1:
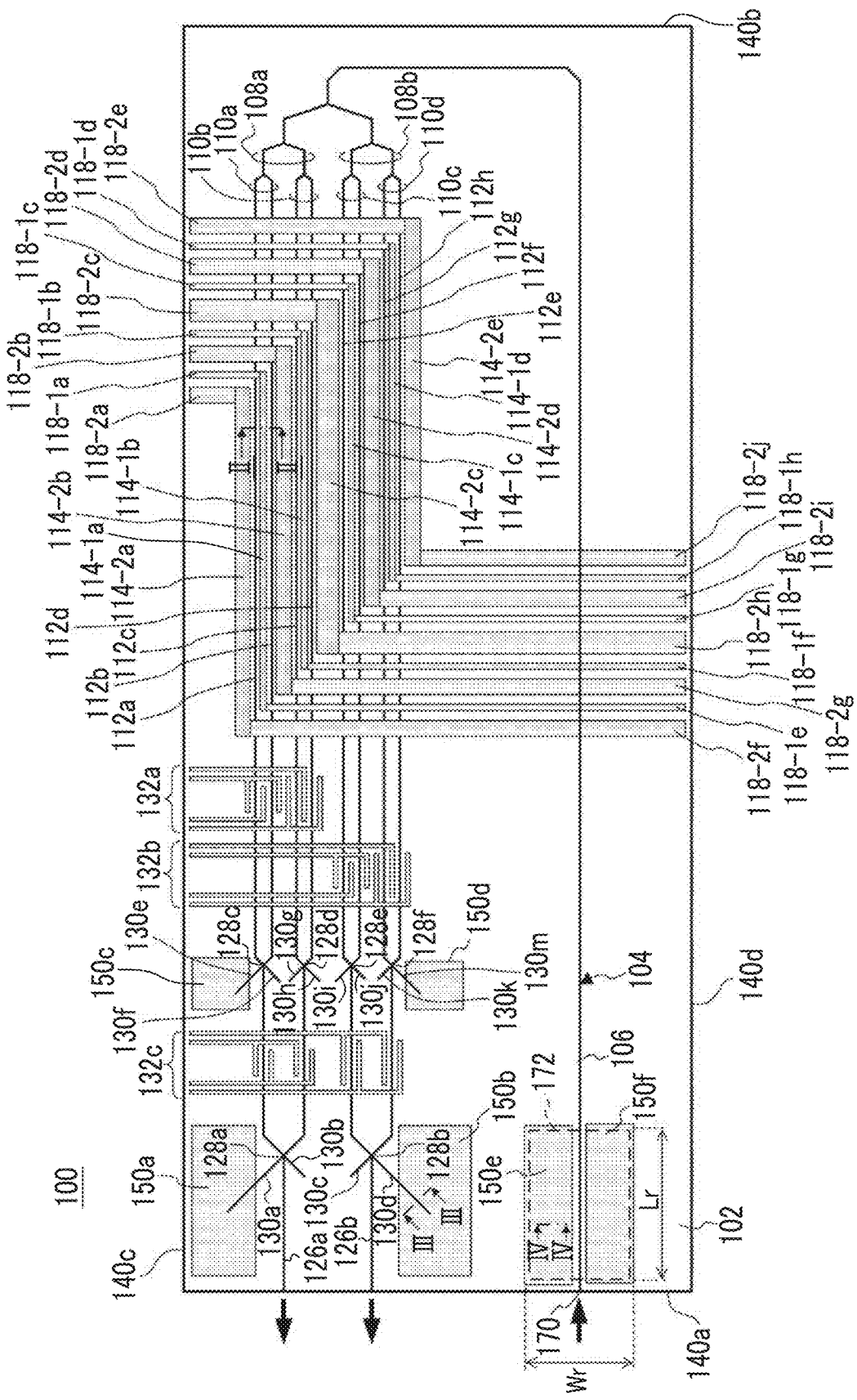
FIG. 1 is a diagram illustrating a configuration of an optical modulation element according to a first embodiment of the present invention.

FIG. 1 is a diagram illustrating a configuration of an optical modulation element 100, which is an optical waveguide device according to a first embodiment of the present invention. The optical modulation element 100 includes an optical waveguide 104 formed on a substrate 102. The substrate 102 is, for example, a thinned X-cut LN substrate having an electro-optic effect, which is processed to a thickness of 20 µm or lower (for example, 2 µm). The optical waveguide 104 is a protruding optical waveguide (for example, a rib-type optical waveguide or a ridge optical waveguide) including a band-shaped extending protruding portion formed on a surface of the thinned substrate 102.

The substrate 102 is, for example, rectangular and has two left and right sides 140a and 140b extending in a vertical direction and facing each other, and upper and lower sides 140c and 140d extending in a lateral direction and facing each other.

The optical modulation element 100 constitutes a DP-QPSK optical modulator with two nest-shaped Mach-Zehnder type optical waveguides 108a and 108b. The nest-shaped Mach-Zehnder type optical waveguide 108a includes two Mach-Zehnder type optical waveguides 110a and 110b. The nest-shaped Mach-Zehnder type optical waveguide 108b includes two Mach-Zehnder type optical waveguides 110c and 110d.

The Mach-Zehnder type optical waveguides 110a and 110b respectively have two parallel waveguides 112a and 112b, and two parallel waveguides 112c and 112d. Further, the Mach-Zehnder type optical waveguides 110c and 110d respectively have two parallel waveguides 112e and 112f, and two parallel waveguides 112g and 112h.

The input light (an arrow pointing to the right side) input to an input waveguide 106 of the optical waveguide 104 on the lower side of the left side 140a of the substrate 102 is folded back by 180 degrees in a light propagation direction and is branched into two light beams, and the light beams are QPSK-modulated by two nest-shaped Mach-Zehnder type optical waveguides 108a and 108b, respectively. The two QPSK-modulated light beams are output from the upper side of the left side 140a of the substrate 102 via output waveguides 126a and 126b, respectively (two arrows pointing to the left side). An end portion of the input waveguide 106 to which light is input is an input end of signal light, and end portions of the output waveguides 126a and 126b from which the light is output are output ends of the signal light.

These two output light beams are output from the substrate 102, polarized and combined, for example, by a polarization beam combiner into one optical beam, and transmitted to a transmission optical fiber as a DP-QPSK-modulated optical signal.

For QPSK modulation in the nest-shaped Mach-Zehnder type optical waveguide 108a, signal electrodes 114-1a and 114-1b to which high-frequency electrical signals for modulation are input are disposed between the two parallel waveguides 112a and 112b of the Mach-Zehnder type optical waveguide 110a and between the two parallel waveguides 112c and 112d of the Mach-Zehnder type optical waveguide 110b, respectively.

Further, for QPSK modulation in the nest-shaped Mach-Zehnder type optical waveguide 108b, signal electrodes 114-1c and 114-1d into which high-frequency electrical signals for modulation are input are disposed between the two parallel waveguides 112e and 112f of the Mach-Zehnder type optical waveguide 110c, and between the two parallel waveguides 112g and 112h of the Mach-Zehnder type optical waveguide 110d, respectively.

The signal electrode 114-1a constitutes a coplanar type transmission line together with the ground electrodes 114-2a and 114-2b facing each other across the parallel waveguides 112a and 112b, respectively, and the signal electrode 114-1b constitutes a coplanar type transmission line together with the ground electrodes 114-2b and 114-2c facing each other across the parallel waveguides 112c and 112d, respectively.

The signal electrode 114-1c constitutes a coplanar type transmission line together with the ground electrodes 114-2c and 114-2d facing each other across the parallel waveguides 112e and 112f, respectively, and the signal electrode 114-1d constitutes a coplanar type transmission line together with the ground electrodes 114-2d and 114-2e facing each other across the parallel waveguides 112e and 112f, respectively.

Hereinafter, the nest-shaped Mach-Zehnder type optical waveguides 108a and 108b are collectively referred to as nest-shaped Mach-Zehnder type optical waveguides 108. Further, the Mach-Zehnder type optical waveguides 110a, 110b, 110c, 110d, 110e, 110f, 110g, and 110h are collectively referred to as Mach-Zehnder type optical waveguides 110. Further, the parallel waveguides 112a, 112b, 112c, 112d, 112e, 112f, 112g, and 112h are collectively referred to as parallel waveguides 112. Further, the signal electrodes 114-1a, 114-1b, 114-1c, and 114-1d are collectively referred to as signal electrodes 114-1. Further, the ground electrodes 114-2a, 114-2b, 114-2c, 114-2d, and 114-2e are collectively referred to as ground electrodes 114-2.

Further, the signal electrode 114-1 and the ground electrode 114-2 are collectively referred to as working electrodes 114. The signal electrode 114-1 and the ground electrode 114-2, which are the working electrodes 114, control the light wave propagating in the optical waveguide 104. Further, the signal electrode 114-1 and the ground electrode 114-2 are two working electrodes 114 that sandwich the parallel waveguide 112 of the optical waveguide 104 in the plane of the substrate 102.

The right end portions of the signal electrodes 114-1a, 114-1b, 114-1c, and 114-1d are connected to signal wiring electrodes 118-1a, 118-1b, 118-1c, and 118-1d, respectively. Further, the left end portions of the signal electrodes 114-1a, 114-1b, 114-1c, and 114-1d are connected to signal wiring electrodes 118-1e, 118-1f, 118-1g, and 118-1h, respectively.

The right ends of the ground electrodes 114-2a, 114-2b, 114-2c, 114-2d, and 114-2e are connected to ground wiring electrodes 118-2a, 118-2b, 118-2c, 118-2d, and 118-2e, respectively. Thus, the signal wiring electrodes 118-1a, 118-1b, 118-1c, and 118-1d and the ground wiring electrodes 118-2a, 118-2b, 118-2c, 118-2d, and 118-2e adjacent to these signal wiring electrodes constitute a coplanar type transmission line.

In the same manner, the left ends of the ground electrodes 114-2a, 114-2b, 114-2c, 114-2d, and 114-2e are connected to ground wiring electrodes 118-2f, 118-2g, 118-2h, 118-2i, and 118-2j, respectively. Thus, the signal wiring electrodes 118-1e, 118-1f, 118-1g, and 118-1h and the ground wiring electrodes 118-2f, 118-2g, 118-2h, 118-2i, and 118-2j adjacent to the signal wiring electrodes constitute a coplanar type transmission line.

The signal wiring electrodes 118-1e, 118-1f, 118-1g, and 118-1h extending to the lower side 140d of the substrate 102 are terminated by a termination resistor having a predetermined impedance outside the substrate 102.

Thus, the high-frequency electrical signal input from the signal wiring electrodes 118-1a, 118-1b, 118-1c, and 118-1d extending to the upper side 140c of the substrate 102 becomes a traveling wave to propagate through the signal electrodes 114-1a, 114-1b, 114-1c, and 114-1d, and modulates the light wave propagating through the Mach-Zehnder type optical waveguides 110a, 110b, 110c, and 110d, respectively.

Hereinafter, the signal wiring electrodes 118-1a, 118-1b, 118-1c, 118-1d, 118-1e, 118-1f, 118-1g, and 118-1h are collectively referred to as signal wiring electrodes 118-1. Further, the ground wiring electrodes 118-2a, 118-2b, 118-2c, 118-2d, 118-2e, 118-2f, 118-2g, 118-2h, 118-2i, and 118-2j are collectively referred to as ground wiring electrodes 118-2. Further, the signal wiring electrode 118-1 and the ground wiring electrode 118-2 are collectively referred to as wiring electrodes 118. That is, the signal wiring electrode 118-1 and the ground wiring electrode 118-2 are the wiring electrodes 118 connected to the working electrode 114.

Further, a bias electrode 132a that adjusts bias points of the Mach-Zehnder type optical waveguides 110a and 110b, a bias electrode 132b that adjusts bias points of the Mach-Zehnder type optical waveguides 110c and 110d, and a bias electrode 132c that adjusts bias points of the nest-shaped Mach-Zehnder type optical waveguides 108a and 108b are provided, on the substrate 102.

Further, radiated light beam waveguides 130a and 130b, and 130c and 130d are respectively provided at Y-branch couplers 128a and 128b of the nest-shaped Mach-Zehnder type optical waveguides 108a and 108b to propagate a radiated light beam leaking from the nest-shaped Mach-Zehnder type optical waveguides 108a and 108b without being combined. In the same manner, two radiated light beam waveguides 130e and 130f, and 130g and 130h are provided at Y-branch couplers 128c and 128d of the Mach-Zehnder type optical waveguides 110a and 110b, respectively. Further, two radiated light beam waveguides 130i and 130j, and 130k and 130m are provided at Y-branch couplers 128e and 128f of the Mach-Zehnder type optical waveguides 110c and 110d, respectively. The configuration and function of such a radiated light beam waveguide are disclosed in, for example, Japanese Patent No. 4745432. Hereinafter, the Y-branch couplers 128a, 128b, 128c, 128d, 128e, and 128f are collectively referred to as Y-branch couplers 128. Further, the radiated light beam waveguides 130a, 130b, 130c, 130d, 130e, 130f, 130g, 130h, 130i, 130j, 130k, and 130m are collectively referred to as radiated light beam waveguides 130.

Figure 2:
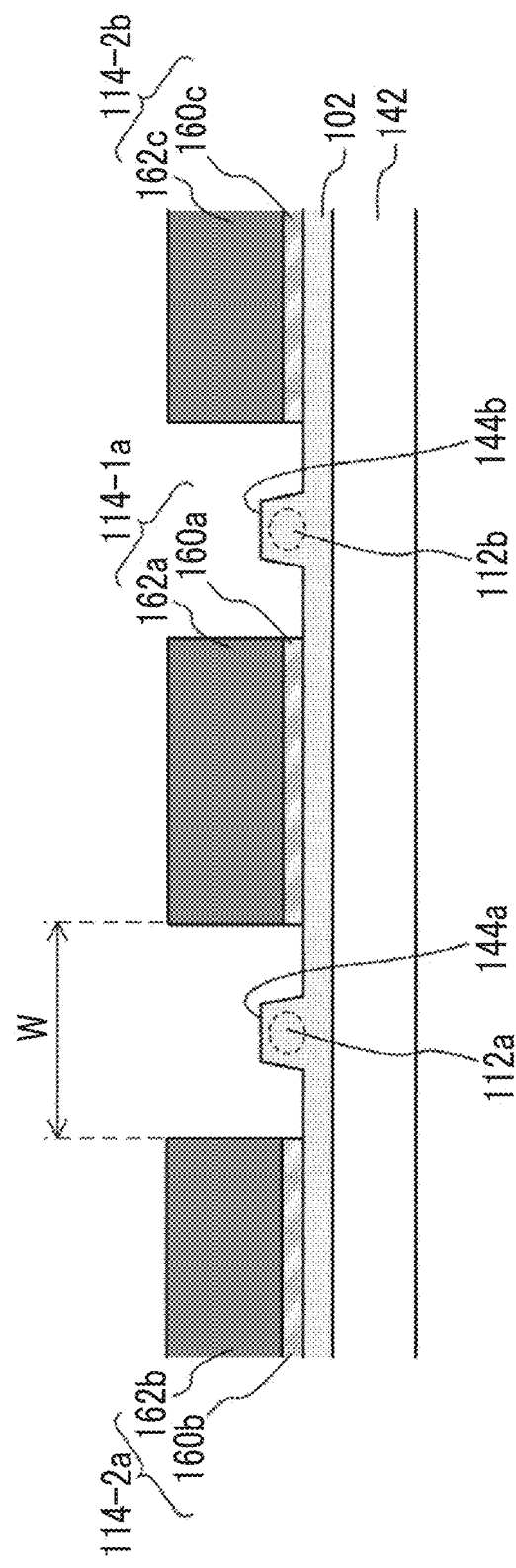
FIG. 2 is a cross-sectional view taken along line II-II of the optical modulation element illustrated in FIG. 1.

FIG. 2 is a cross-sectional view taken along line II-II of the optical modulation element 100 illustrated in FIG. 1, and is a diagram illustrating a cross-section of the substrate 102 in an action portion (a portion at which a light wave is controlled by a working electrode) of the Mach-Zehnder type optical waveguide 110a.

A back surface (lower surface in FIG. 2) of the substrate 102 is supported and reinforced by a supporting plate 142. The supporting plate 142 is, for example, glass. The parallel waveguides 112a and 112b are formed on an upper surface of the substrate 102, as protruding optical waveguides, by protruding portions 144a and 144b formed on the substrate 102, respectively. The two dotted ellipses schematically illustrate light propagating through the parallel waveguides 112a and 112b, which are protruding optical waveguides, respectively. Hereinafter, the protruding portions on the substrate 102 constituting the optical waveguide 104, including the protruding portions 144a and 144b, are collectively referred to as protruding portions 144.

The signal electrodes 114-1a and the ground electrodes 114-2a and 114-2b sandwiching the parallel waveguides 112a and 112b in the plane of the substrate 102 are configured with first base layers 160a, 160b, and 160c made of a first material, and first conductive layers 162a, 162b, and 162c formed on the first base layers 160a, 160b, and 160c, respectively. In the present embodiment, the first conductive layers 162a, 162b, and 162c are made of gold (Au). Further, in the present embodiment, the first material constituting the first base layers 160a, 160b, and 160c is, for example, niobium (Nb). Niobium has a small light absorption coefficient at an operating optical wavelength of the optical modulation element 100 (for example, 1.3 μm bandwidth and/or 1.55 μm bandwidth, which are wavelengths for optical communication), as compared with titanium, which is generally used as a base layer material for electrodes in the related art.

Therefore, the signal electrodes 114-1a and the ground electrodes 114-2a and 114-2b can be formed closer to the parallel waveguides 112a and 112b, as compared with the related art. As a result, with the optical modulation element 100, an electric field can be efficiently generated in the parallel waveguides 112a and 112b (that is, electric field efficiency can be increased), it is possible to achieve a high-frequency optical modulation operation with a smaller drive voltage as compared with the related art. For example, in the present embodiment, a gap W between the signal electrode 114-1a and the ground electrode 114-2a, which are two working electrodes sandwiching the parallel waveguide 112a is equal to or higher than 1.0 μm and equal to or lower than 5.0 μm.

The other signal electrodes 114-1b, 114-1c, and 114-1d other than the signal electrode 114-1a, and the ground electrodes 114-2c, 114-2d, and 114-2e other than the ground electrodes 114-2a and 114-2b are also configured in the same manner as the signal electrodes 114-1a and the ground electrodes 114-2a and 114-2b described above. Hereinafter, the first base layers and the first conductive layers of the signal electrode 114-1 and the ground electrode 114-2 will be collectively referred to as first base layers 160 and first conductive layers 162, respectively.

In the optical modulation element 100 according to the present embodiment, in particular, in a region on the substrate 102, a conductor pattern including a second base layer made of a second material different from the first material and a second conductive layer on the second base layer is formed in a region at which unnecessary light propagates. Here, the unnecessary light means light that is controlled by the signal electrode 114-1 and does not contribute to the output light (for example, output signal light) output from the optical waveguide 104 to the outside of the substrate 102.

One example of the above-described region in which the unnecessary light propagates is a region in which the radiated light beam waveguide 130 through which an unnecessary radiated light beam propagates is formed. In the optical modulation element 100 illustrated in FIG. 1, in regions on the substrate 102 in which the radiated light beam waveguides 130a, 130d, 130e, and 130m are formed, conductor patterns 150a, 150b, 150c, and 150d are formed to covers at least apart of each of these radiated light beam waveguides.

Figure 3:
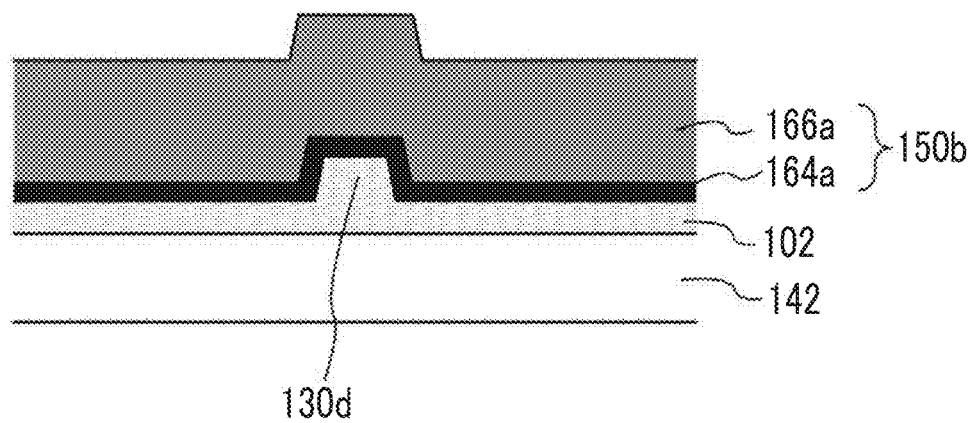
FIG. 3 is a cross-sectional view taken along line III-III of the optical modulation element illustrated in FIG. 1.

FIG. 3 is a cross-sectional view taken along line III-III in FIG. 1, and is a cross-sectional view of a portion at which the radiated light beam waveguide 130d is formed. The conductor pattern 150b is formed on the substrate 102 so as to cover the radiated light beam waveguide 130d. The conductor pattern 150b includes a second base layer 164a made of a second material different from the first material described above, and a second conductive layer 166a on the second base layer 164a.

In the present embodiment, the second conductive layer 166a is made of gold (Au). It is desirable that the second material constituting the second base layer 164a has a light absorption coefficient higher than a light absorption coefficient of the first material at the operating optical wavelength of the optical modulation element 100. In the present embodiment, the second material is titanium.

The conductor patterns 150a, 150c, and 150d formed to respectively cover the radiated light beam waveguides 130a, 130e, and 130m in FIG. 1 are also configured in the same manner as the conductor pattern 150b illustrated in FIG. 3 described above.

Another example of the region in which the unnecessary light propagates on the substrate 102 is a rectangular region 172 surrounded by a dotted rectangular line, which is adjacent to a light input portion 170 (that is, a portion of the left side 140a at which the end portion of the input waveguide 106 is formed) to which light is input from the outside of the substrate 102 through the optical waveguide 104. In the optical modulation element 100 illustrated in FIG. 1, the conductor patterns 150e and 150f are formed so as to avoid the input waveguide 106 and overlap with the rectangular region 172.

Figure 4:
FIG. 4 is a cross-sectional view taken along line IV-IV of the optical modulation element illustrated in FIG. 1.

FIG. 4 is a cross-sectional view taken along line IV-IV of the optical modulation element 100 illustrated in FIG. 1. In the same manner as the conductor pattern 150b illustrated in FIG. 3, the conductor pattern 150e includes a second base layer 164b made of a second material formed on the substrate 102 and a second conductive layer 166b on the second base layer 164b. Further, in the same manner as the conductor pattern 150b described above, a material constituting the second conductive layer 166b is gold, and the second material constituting the second base layer 164b is titanium.

As illustrated in FIG. 1, a width Wr of the rectangular region 172 in a direction orthogonal to an input direction of light is, for example, a width according to an NA (numerical aperture) of a lens when the input light is light focused by the lens or an optical fiber when the input light is light directly input from the optical fiber, respectively. Further, a length Lr of the rectangular region 172 along the input direction of the light can be, for example, a length according to an intensity of unnecessary light that can be input in the substrate 102 from the light input portion 170.

Hereinafter, the conductor patterns 150a, 150b, 150c, 150d, 150e, and 150f are collectively referred to as conductor patterns 150. Further, the second base layer and the second conductive layer of each conductor pattern 150 are collectively referred to as a second base layer 164 and a second conductive layer 166, respectively.

The optical modulation element 100 having the above-described configuration includes the working electrode 114 that controls a light wave propagating in the parallel waveguide 112, and the conductor pattern 150 provided in the region of the substrate 102 at which unnecessary light propagates. Then, the second base layer 164 constituting the conductor pattern 150 includes the second material having a higher light absorption coefficient at an operating optical wavelength than the first material constituting the first base layer 160 of the working electrode 114 that needs to be disposed closer to the parallel waveguide 112.

Thus, the optical modulation element 100 can effectively remove the unnecessary light propagating in the substrate 102 while suppressing a light absorption loss that may occur due to the working electrode 114 in the parallel waveguide 112. As a result, with the optical modulation element 100, it is possible to achieve a modulation operation driven at a lower voltage with appropriate optical characteristics such as an extinction ratio as compared with the related art. A thickness of the second base layer 164 is preferably 100 nm or higher, from the viewpoint of effectively absorbing unnecessary light.

Figure 5:
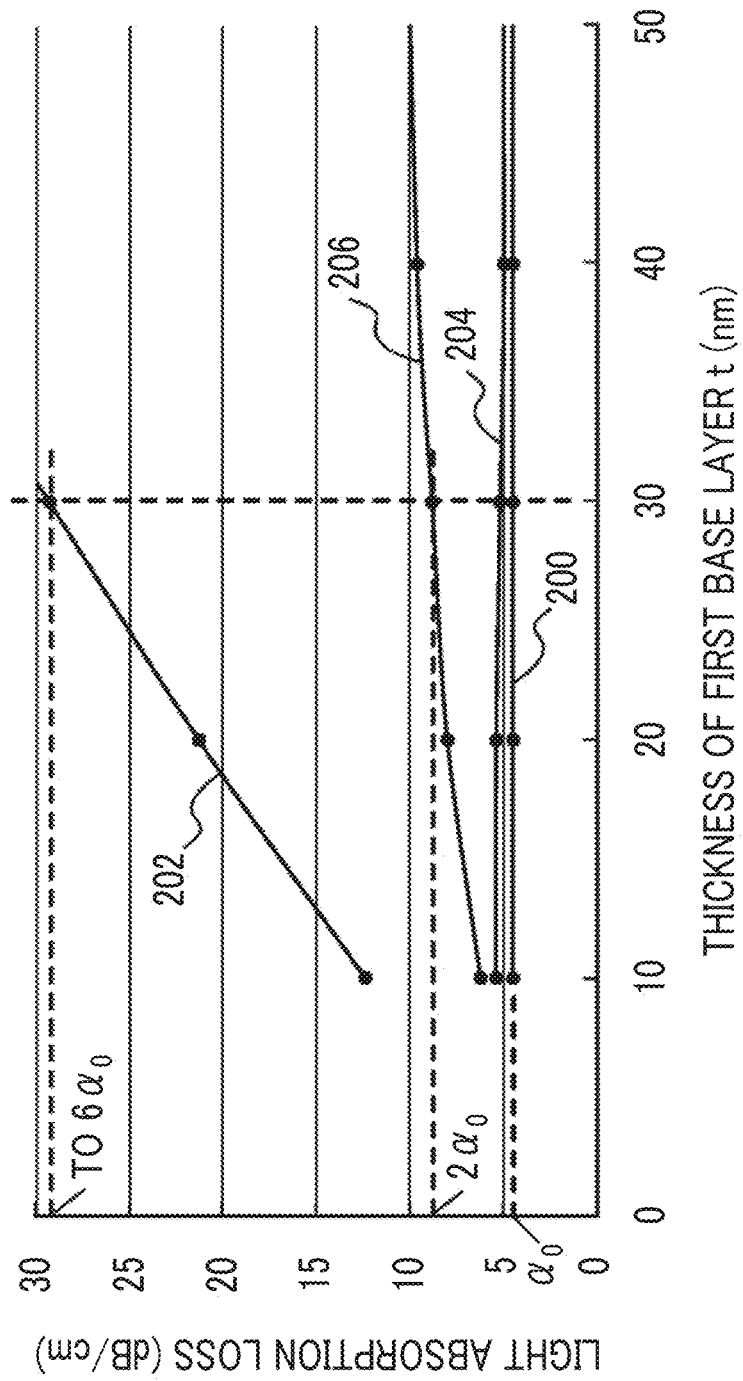
FIG. 5 is a simulation result of the amount of increase in light absorption loss with respect to a thickness of a first base layer in a case where various metals are used as the first base layer.

The material constituting the first base layer 160 is not limited to niobium, and if the material has a smaller light absorption coefficient at the operating optical wavelength as compared with titanium used in the related art, by providing the working electrode 114 to be close to the parallel waveguide 112, electric field efficiency of the optical modulation element 100 can be improved as compared with the optical modulation element in the related art. FIG. 5 is a simulation result of the amount of increase in light absorption loss in the parallel waveguide 112 with respect to a thickness of the first base layer 160 in a case where the first base layer 160 includes various metals. In FIG. 5, in addition to a case where the first base layer 160 is not used (in a case of Au single film (only the first conductive layer 162)), a calculation result in a case where Ti, aluminum (Al), and Nb are used as materials for the first base layer 160 is illustrated.

In FIG. 5, a horizontal axis is the thickness t of the first base layer 160, and a vertical axis is the amount of light absorption loss per unit length (1 cm) of the parallel waveguide 112 adjacent to the first base layer 160. In the simulation, it is assumed that Au is used as the first conductive layer 162, and 1.55 µm is set as an operating optical wavelength. Further, in calculating the light absorption loss, the amount of light absorption at the operating wavelength of 1.55 µm of each metal obtained from a light absorption spectra of Ti, Al, and Nb is used.

A light absorption loss $\alpha 0$ in a case of the Au single film illustrated in line 200 (without abase layer) is a light absorption loss as a background in the above-described configuration, and the light absorption loss in the first base layer 160 can be evaluated as the increase in light absorption loss from this reference line.

Lines 202, 204, and 206 illustrate light absorption losses in a case where the metal constituting the first base layer 160 includes Ti, Al, and Nb, respectively. Among these metals, Ti illustrated by line 202 has the largest light absorption loss, and the light absorption loss increases greatly with a film thickness.

On the other hand, it is understood that in lines 204 and 206 illustrating a case where Al and Nb of which operating wave light lengths are not included in a light absorption region are used as the first base layer 160, the light absorption loss is significantly reduced as compared with a case of Ti (line 202). In a range of the evaluation results illustrated in FIG. 5, in a case where the first base layer 160 is Al (line 204), the light absorption loss is the smallest, and the light absorption loss is substantially constant with respect to the thickness of the base layer. Meanwhile, it is generally known that Al has a low adhesion strength to a substrate.

From lines 206 and 200 in FIG. 5, it is desirable that the thickness of the first base layer 160 configured with Nb is equal to or lower than 30 nm. If the thickness of the base layer of Nb is within this range, the light absorption loss can be suppressed to a value equal to or lower than $2\alpha 0$, which is twice the value of $\alpha 0$ in the Au single film, or a value of ⅓ or lower of a value in the case of the first base layer 160 using Ti in the related art, which is approximately $6\alpha 0$.

In a case where the first conductive layer 162 and the second conductive layer 166 are made of gold, an etching solution containing iodine or iodide as an etching solution for patterning these conductive layers, in some cases, in a manufacturing process of the optical modulation element 100. Therefore, in such a case, as the first material constituting the first base layer 160 and the second material constituting the second base layer 164, instead of a material such as Al having low resistance to iodine, it is preferable to use a material that does not react with iodine (for example, Nb).

The radiated light beam waveguide 130 for removing unnecessary light may be used as a monitor optical waveguide. In this case, of course, an end portion of the monitor waveguide is also an output end of a signal light.

Modification Example

In the above-described optical modulation element 100, the conductor pattern 150 having the second base layer 164 and the second conductive layer 166 is formed so as to cover a part of the radiated light beam waveguide for removing unnecessary light. Meanwhile, the location at which the conductor pattern 150 is formed is not limited to the above. For example, in the region on the substrate 102, the conductor pattern 150 including the second base layer 164 made of a second material different from the first material and the second conductive layer 166 on the second base layer 164 may be formed, in a region other than a path from the input end to the output end of the signal light of the optical waveguide 104.

In the above-described configuration, the conductor pattern 150 may be configured as follows, in a region of the substrate 102 adjacent to the optical waveguide 104.

Figure 6:
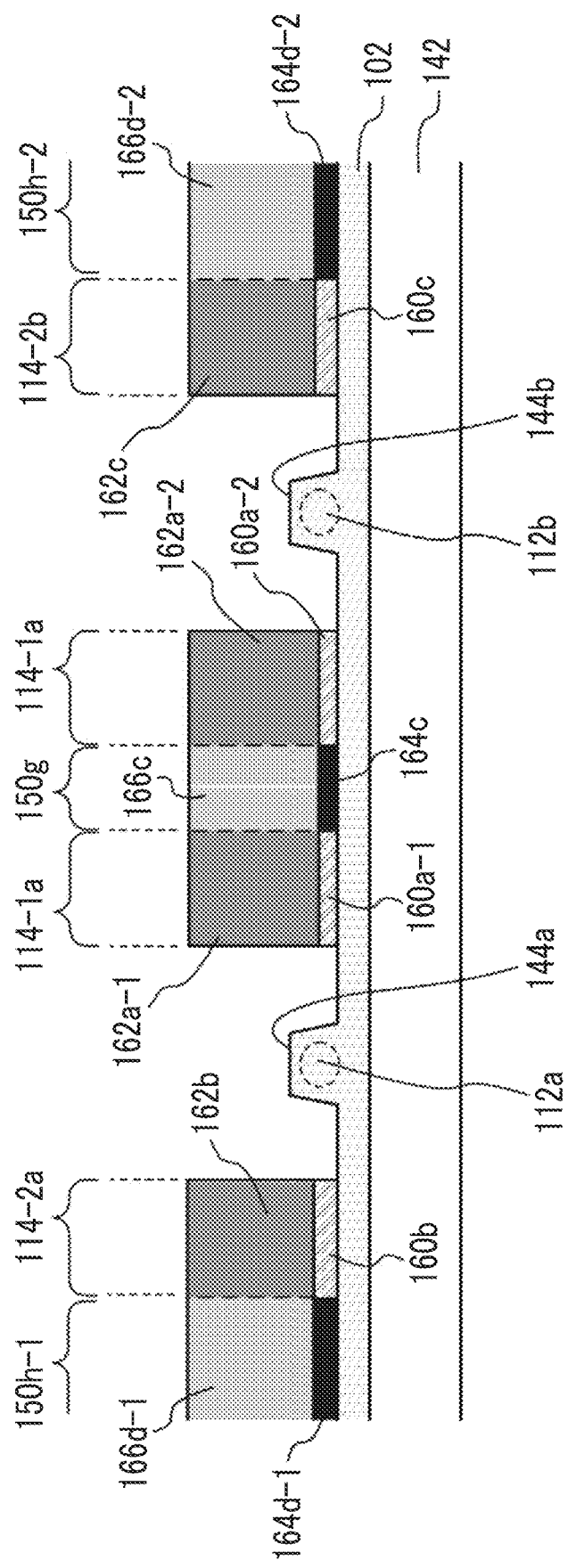
FIG. 6 is a diagram illustrating an example of a conductor pattern provided adjacent to a working electrode according to a modification example of the optical modulation element according to the first embodiment.

For example, the conductor pattern 150 may be provided adjacent to the working electrode 114. As an example, the optical modulation element 100 can have a configuration illustrated in FIG. 6, as a cross-section taken along line II-II in FIG. 1. FIG. 6 is a cross-sectional view taken along line II-II corresponding to FIG. 2 described above.

In FIG. 6, the signal electrode 114-1a constituting the working electrode is formed by being divided into two portions respectively adjacent to the parallel waveguides 112a and 112b, and includes conductor pattern 150g sandwiched between the two signal electrodes 114-1a. In other words, the working electrode 114 is provided to be adjacent to the parallel waveguide 112, and the conductor pattern 150g is formed so as to be in contact with a side surface of the working electrode 114 facing a side surface adjacent to the parallel waveguide 112.

In the same manner, the ground electrodes 114-2a and 114-2b constituting the working electrode 114 are formed respectively adjacent to the parallel waveguides 112a and 112b, and conductor patterns 150h-1 and 150h-2 are formed to be in contact with side surfaces facing side surfaces adjacent to the parallel waveguides 112a and 112b, among side surfaces of the ground electrodes 114-2a and 114-2b.

Here, the conductor pattern 150g includes a second base layer 164c and a second conductive layer 166c. Further, the conductor pattern 150h-1 includes a second base layer 164d-1 and a second conductive layer 166d-1, and the conductor pattern 150h-2 includes a second base layer 164d-2 and a second conductive layer 166d-2.

Figure 7:
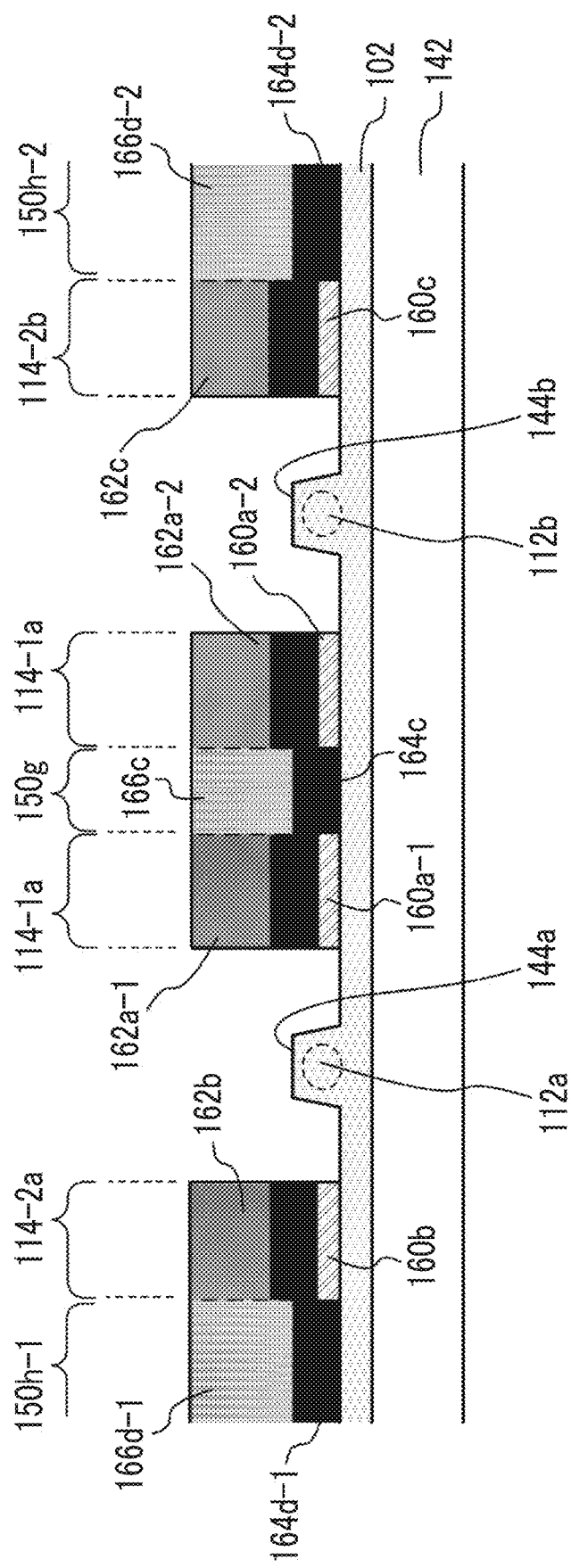
FIG. 7 is a diagram illustrating another example of the conductor pattern provided adjacent to the working electrode according to the modification example of the optical modulation element according to the first embodiment.

As another example in which the conductor pattern 150 is provided in the region other than the path from the input end to the output end of the optical waveguide 104, the optical modulation element 100 can have a configuration as illustrated in FIG. 7, as a cross-section taken along II-II in FIG. 1. FIG. 7 is a cross-sectional view taken along line II-II corresponding to FIG. 2 described above, and is an example in which the second base layer 164 is extended to the insides of the adjacent working electrodes 114 in the configuration in FIG. 6 described above.

Specifically, the second base layer 164c is extended between the first base layer 160a-1 and the first conductive layer 162a-1 of the two adjacent signal electrodes 114-1a. Further, the second base layer 164d-1 is extended between the first base layer 160b and the first conductive layer 162b of the adjacent ground electrodes 114-2a. In the same manner, the second base layer 164d-2 is extended between the first base layer 160b-2 and the first conductive layer 162b-2 of the adjacent ground electrodes 114-2b.

Figure 8:
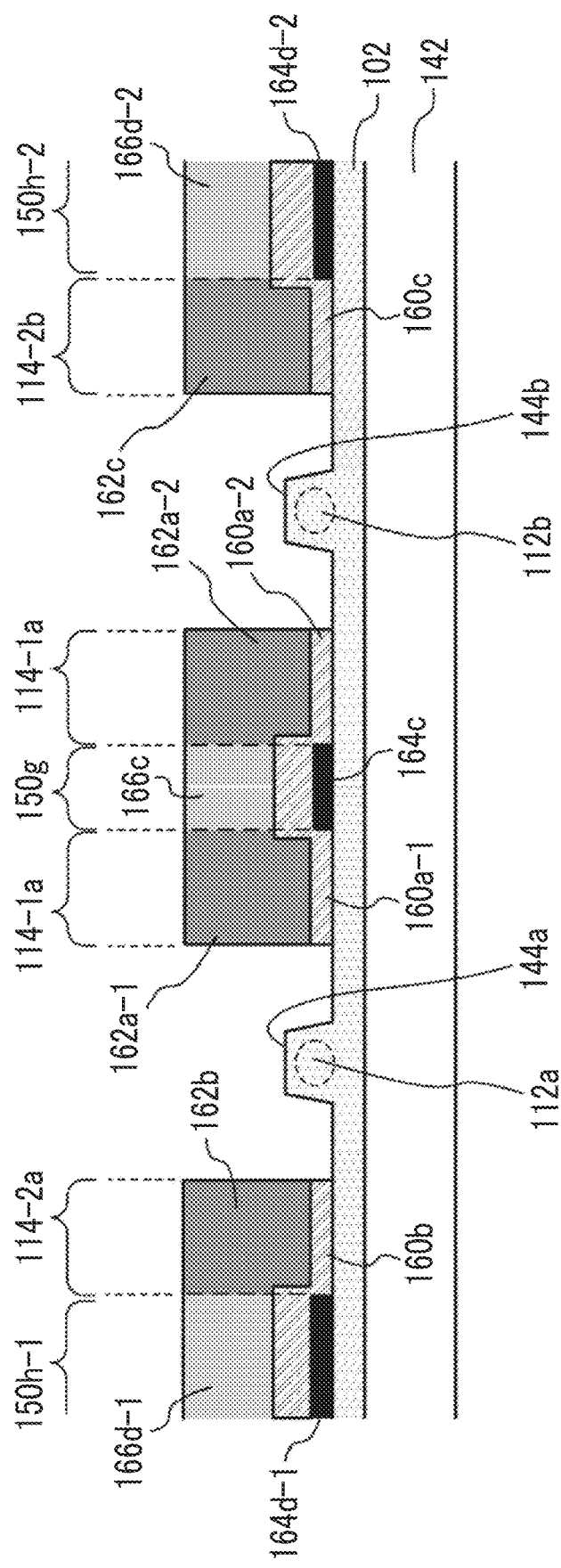
FIG. 8 is a diagram illustrating still another example of the conductor pattern provided adjacent to the working electrode according to the modification example of the optical modulation element according to the first embodiment.

As still another example in which the conductor pattern 150 is provided in the region other than the path from the input end to the output end of the optical waveguide 104, the optical modulation element 100 can have a configuration as illustrated in FIG. 8, as a cross-section taken along II-II in FIG. 1. FIG. 8 is a cross-sectional view taken along line II-II corresponding to FIG. 2 described above, and is an example in which the first base layer 160 is extended to the inside of the adjacent conductor pattern 150 in the configuration in FIG. 6 described above.

Although the first conductive layer 162 and the second conductive layer 166 are described separately in FIG. 6, FIG. 7, and FIG. 8, the respective materials may be materials different from each other or may be the same material. In particular, in a case where the same material is used, efficiency of the process can be improved by forming the first conductive layer 162 and the second conductive layer 166 by the same process.

Specifically, the first base layer 160a-1 is extended between the second base layer 164c and the second conductive layer 166c of the two adjacent conductor pattern 150g. Further, the first base layer 160b is extended between the second base layer 164d-1 and the second conductive layer 166d-1 of the adjacent conductor pattern 150h-1. In the same manner, the first base layer 160c is extended between the second base layer 164d-2 and the second conductive layer 166d-2 of the adjacent conductor pattern 150h-2.

In the configuration according to the modification example as described above, the wiring electrode 118 may have the second base layer 164 instead of the first base layer 160, in a portion other than a portion intersecting with the optical waveguide 104. For example, the wiring electrode 118 may include the first base layer 160 formed in at least at a portion intersecting with the optical waveguide 104 to be in contact with the optical waveguide 104, and include the second base layer 164 at the other portion.

Figure 9:
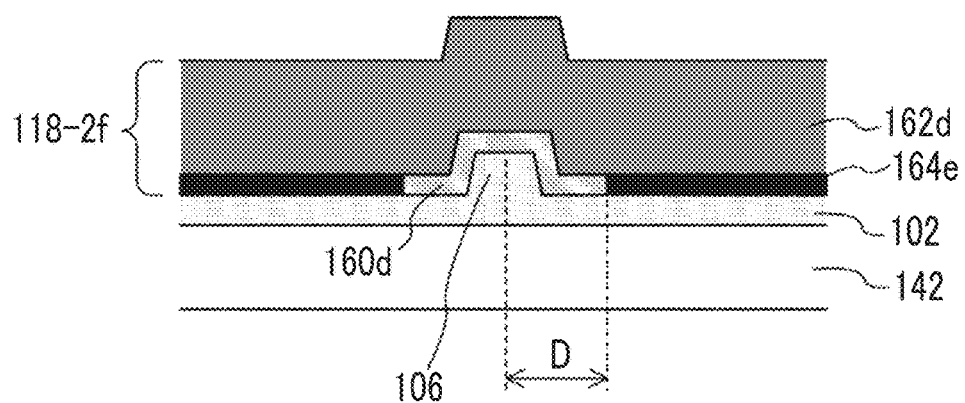
FIG. 9 is a diagram illustrating an example of a configuration of a wiring electrode according to the modification example of the optical modulation element according to the first embodiment.

As an example, the optical modulation element 100 can be configured as illustrated in FIG. 9 at an intersection portion of the ground wiring electrode 118-2f and the input waveguide 106 in FIG. 1. FIG. 9 is a cross-sectional view of the intersection portion of the ground wiring electrode 118-2f and the input waveguide 106 along a plane orthogonal to an extending direction of the input waveguide 106. In the configuration in FIG. 9, the ground wiring electrode 118-2f includes, for example, a first base layer 160d and a first conductive layer 162d at the intersection portion with the input waveguide 106, and includes a second base layer 164e and the first conductive layer 162d at a portion other than the intersection portion. In the above-described configuration, a distance D from a center of the input waveguide 106 to an end portion of the second base layer 164e is desirable to be larger than a mode field diameter of light in the input waveguide 106, in order to suppress a light absorption loss due to the second base layer 164e.

Figure 10:
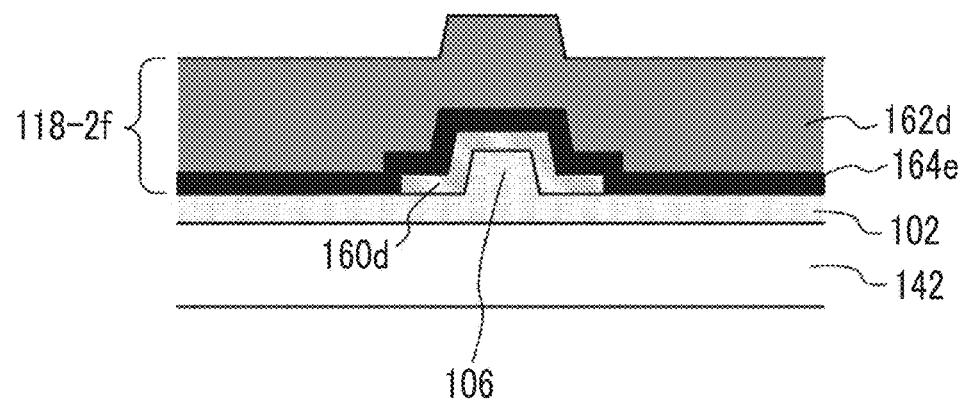
FIG. 10 is a diagram illustrating another example of the configuration of the wiring electrode according to the modification example of the optical modulation element according to the first embodiment.

As another example, the ground wiring electrode 118-2f can be configured as illustrated in FIG. 10. FIG. 10 illustrates an example in which the second base layer 164e is extended to an upper portion of the first base layer 160d provided at the intersection portion of the ground wiring electrode 118-2f and the input waveguide 106, in the configuration illustrated in FIG. 9.

Figure 11:
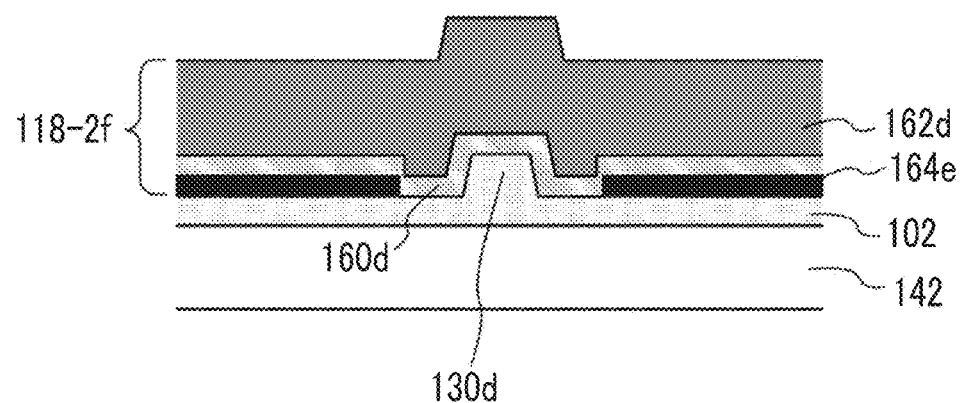
FIG. 11 is a diagram illustrating still another example of the configuration of the wiring electrode according to the modification example of the optical modulation element according to the first embodiment.

As still another example, the ground wiring electrode 118-2f can be configured as illustrated in FIG. 11. FIG. 11 is an example in which the first base layer 160d is extended to an upper portion of the second base layer 164e in a portion other than the intersection portion with the input waveguide 106, in the configuration illustrated in FIG. 9.

Second Embodiment

Figure 13:
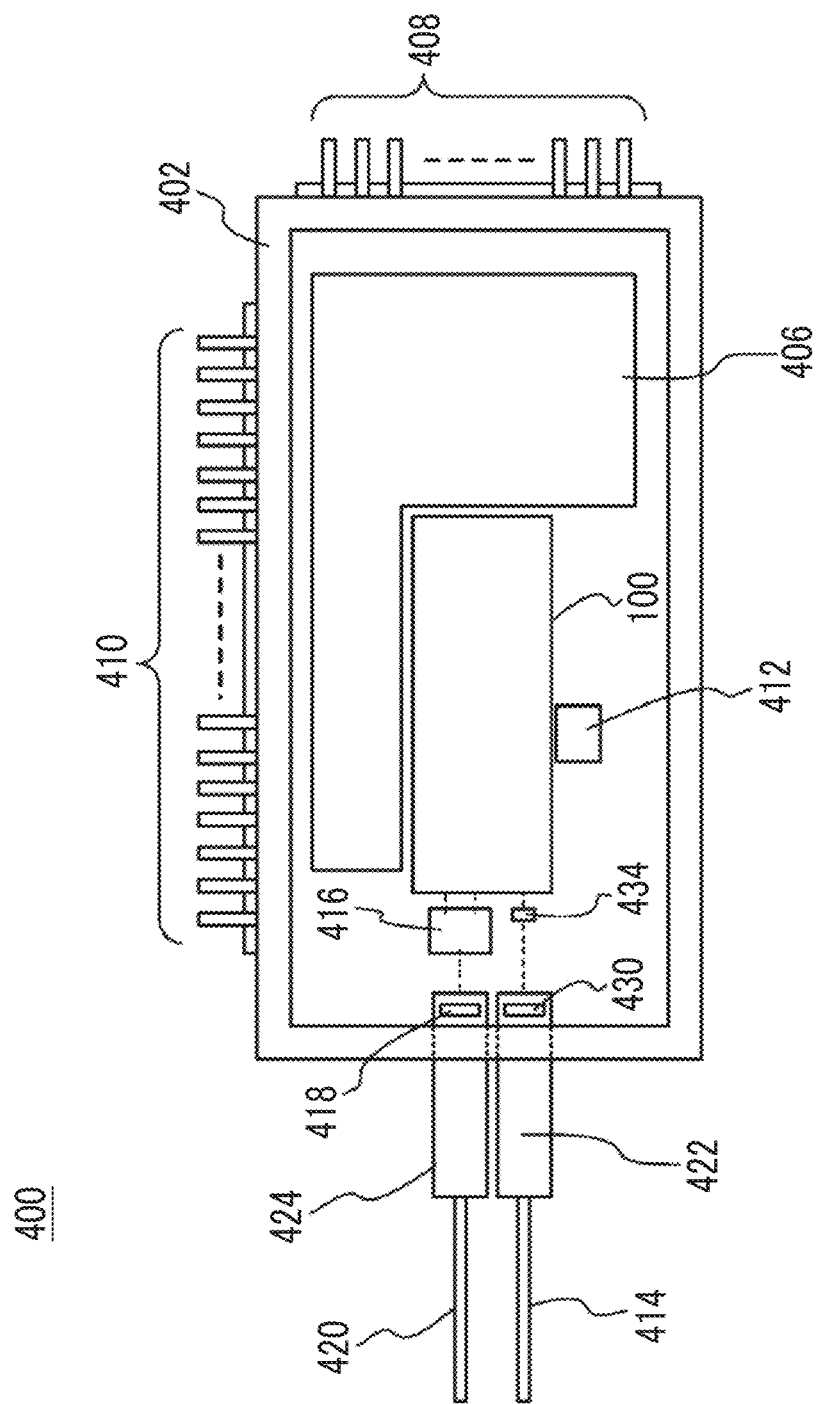
FIG. 13 is a diagram illustrating a configuration of an optical modulator according to a second embodiment of the present invention.

Next, a second embodiment of the present invention will be described. The present embodiment is an optical modulator using the optical modulation element 100 described above. FIG. 13 is a diagram illustrating a configuration of an optical modulator 400 according to the second embodiment. The optical modulator 400 includes a case 402, the optical modulation element 100 housed in the case 402, and a relay substrate 406. Finally, a cover (not illustrated), which is a plate body, is fixed to an opening portion of the case 402, and the inside of the case 402 is hermetically sealed.

The optical modulator 400 has signal pins 408 for inputting a high-frequency electrical signal to be used for modulation of the optical modulation element 100, and signal pins 410 for inputting an electrical signal to be used for adjusting an operating point of the optical modulation element 100.

Further, the optical modulator 400 has an input optical fiber 414 for inputting light into the case 402 and an output optical fiber 420 for guiding the light modulated by the optical modulation element 100 to the outside of the case 402, on the same surface of the case 402 (in the present embodiment, the surface on the left side).

Here, the input optical fiber 414 and the output optical fiber 420 are respectively fixed to the case 402 via supports 422 and 424 which are fixing members. The light input from the input optical fiber 414 is collimated by a lens 430 disposed in the support 422, and then input to the optical modulation element 100 via a lens 434. Meanwhile, this is only an example, and the light may be input to the optical modulation element 100, based on the related art, for example, by introducing the input optical fiber 414 into the case 402 via the support 422, and connecting an end surface of the introduced input optical fiber 414 to an end surface of the substrate 102 of the optical modulation element 100.

The light output from the optical modulation element 100 is coupled to the output optical fiber 420 via the optical unit 416 and a lens 418 disposed on the support 424. The optical unit 416 may include a polarization beam combiner that combines two modulated light beams output from the optical modulation element 100 into a single beam.

The relay substrate 406 relays the high-frequency electrical signal input from the signal pins 408 and the electrical signal for adjusting an operating point (bias point) input from the signal pins 410 to the optical modulation element 100, according to a conductor pattern (not illustrated) formed on the relay substrate 406. The conductor pattern on the relay substrate 406 is connected to each one end of the wiring electrode 118 of the optical modulation element 100 by, for example, wire bonding or the like. Further, the optical modulator 400 includes a terminator 412 having a predetermined impedance in the case 402.

Since the optical modulator 400 having the above-described configuration is configured by using the optical modulation element 100 according to the first embodiment described above, it is possible to achieve a modulation operation driven at a lower voltage with appropriate optical characteristics such as an extinction ratio as compared with the related art.

Third Embodiment

Figure 14:
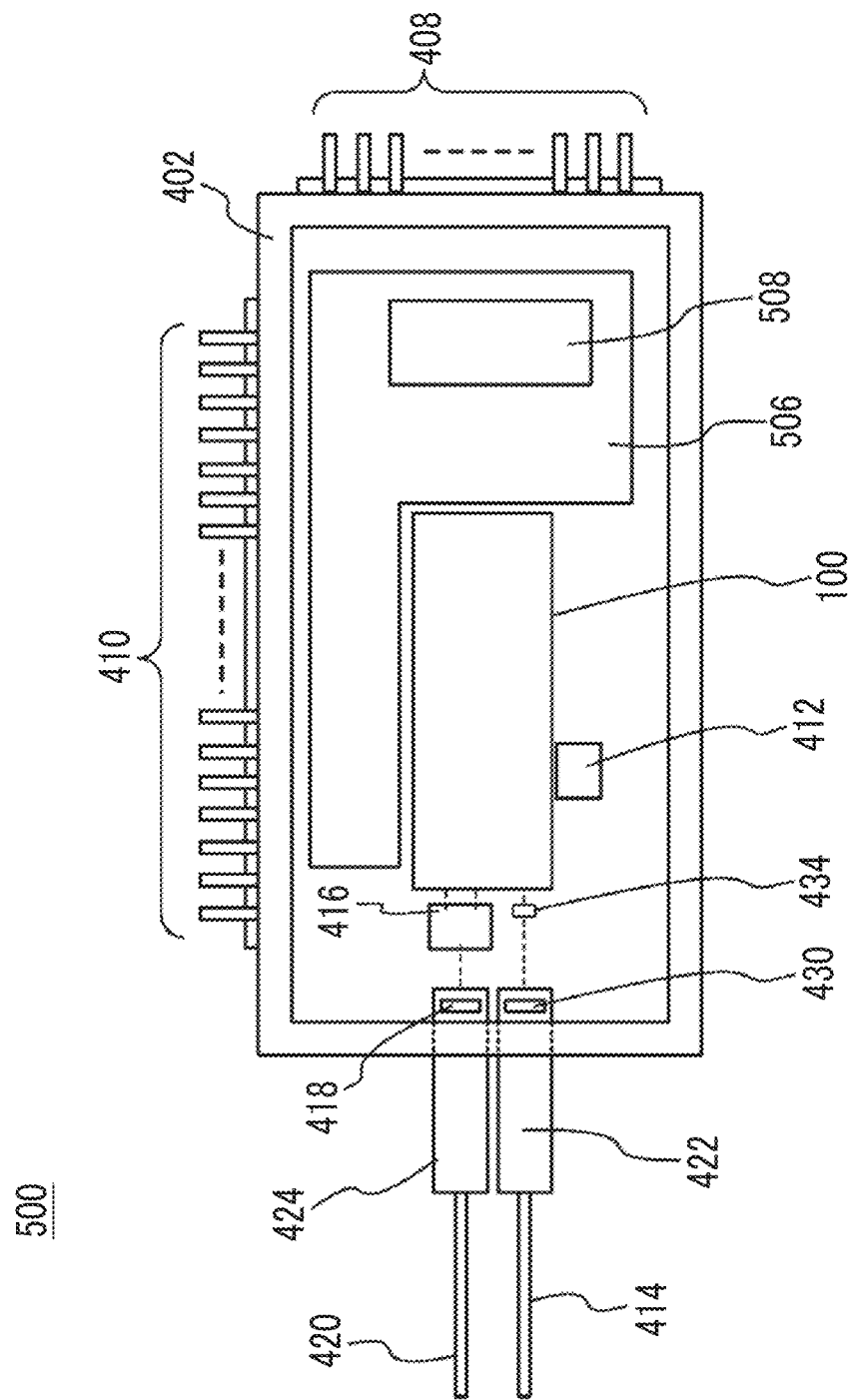
FIG. 14 is a diagram illustrating a configuration of an optical modulation module according to a third embodiment of the present invention.

Next, a third embodiment of the present invention will be described. The present embodiment is an optical modulation module 500 using the optical modulation element 100 according to the first embodiment described above. FIG. 14 is a diagram illustrating a configuration of an optical modulation module 500 according to the present embodiment. In FIG. 14, for the same components as in the optical modulator 400 according to the second embodiment illustrated in FIG. 13, the same reference numerals as those illustrated in FIG. 13 are used, and the above description for FIG. 13 is incorporated.

The optical modulation module 500 has the same configuration as the optical modulator 400 illustrated in FIG. 13, but differs from the optical modulator 400 in that it includes a circuit substrate 506 instead of the relay substrate 406. The circuit substrate 506 includes a drive circuit 508. The drive circuit 508 generates a high-frequency electrical signal for driving the optical modulation element 100 based on, for example, a modulation signal supplied from the outside via the signal pins 408, and outputs the generated high-frequency electrical signal to the optical modulation element 100.

Since the optical modulation module 500 having the above-described configuration is configured by using the optical modulation element 100 according to the first embodiment described above, it is possible to achieve a modulation operation driven at a lower voltage with appropriate optical characteristics such as an extinction ratio as compared with the related art.

Fourth Embodiment

Figure 15:
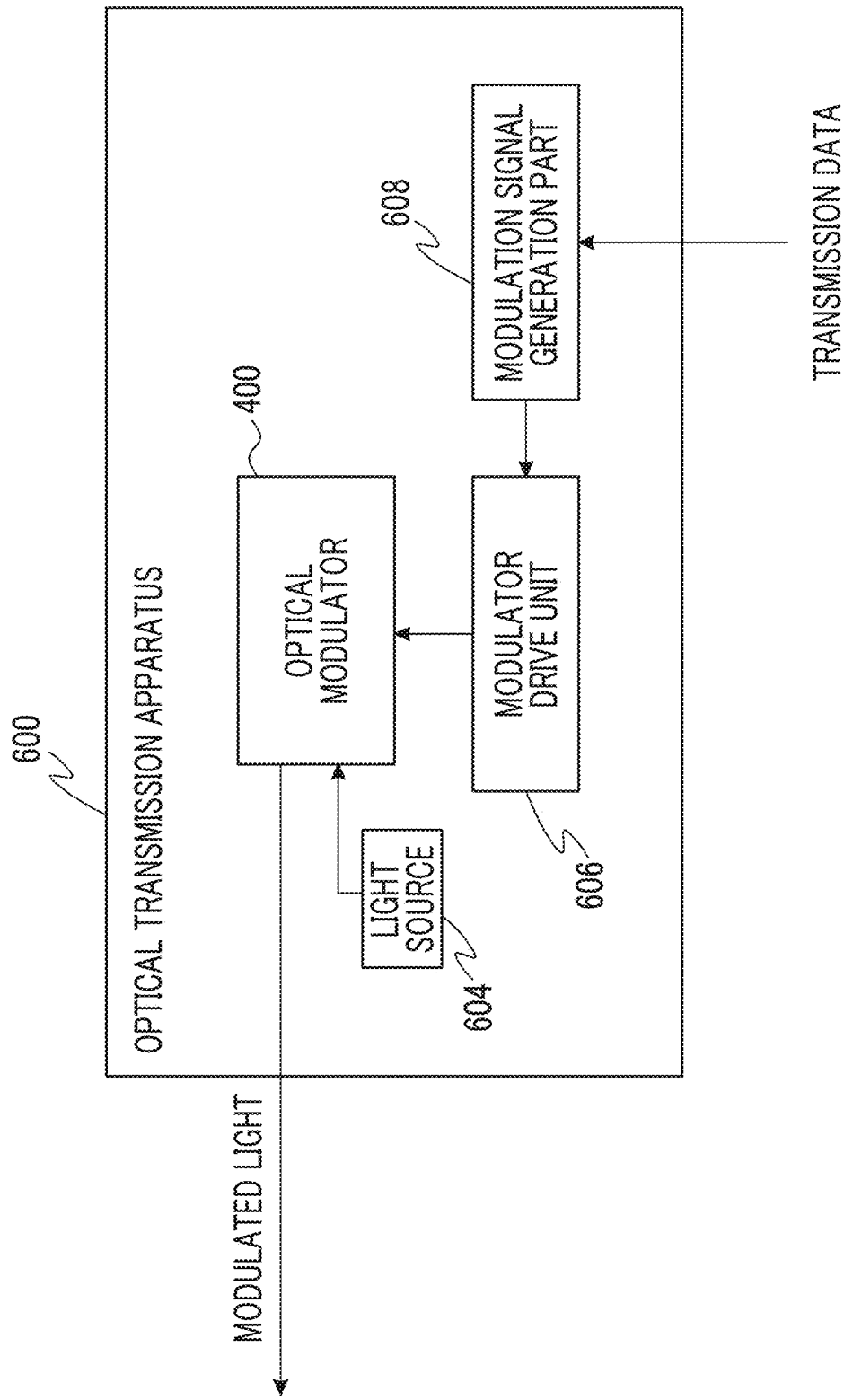
FIG. 15 is a diagram illustrating a configuration of an optical transmission apparatus according to a fourth embodiment of the present invention.

Next, a fourth embodiment of the present invention will be described. The present embodiment is an optical transmission apparatus 600 equipped with the optical modulator 400 according to the second embodiment. FIG. 15 is a diagram illustrating a configuration of the optical transmission apparatus 600 according to the present embodiment. The optical transmission apparatus 600 includes the optical modulator 400, a light source 604 that inputs light to the optical modulator 400, a modulator drive unit 606, and a modulation signal generation part 608. The above-described optical modulation module 500 can also be used instead of the optical modulator 400 and the modulator drive unit 606.

The modulation signal generation part 608 is an electronic circuit that generates an electrical signal for causing the optical modulator 400 to perform a modulation operation, which generates, based on transmission data given from the outside, a modulation signal which is a high-frequency signal for causing the optical modulator 400 to perform an optical modulation operation according to the modulation data, and outputs the modulation signal to the modulator drive unit 606.

The modulator drive unit 606 amplifies the modulation signal input from the modulation signal generation part 608, and outputs a high-frequency electrical signal for driving a signal electrode of the optical modulation element 100 included in the optical modulator 400. As described above, instead of the optical modulator 400 and the modulator drive unit 606, for example, the optical modulation module 500 provided with a drive circuit 508 including a circuit corresponding to the modulator drive unit 606 inside the case 402 can also be used.

The high-frequency electrical signal is input to the signal pins 408 of the optical modulator 400 to drive the optical modulation element 100. Thus, the light output from the light source 604 is modulated by the optical modulator 400, becomes modulated light, and is output from the optical transmission apparatus 600.

Since the optical transmission apparatus 600 having the above-described configuration uses the optical modulation element 100, in the same manner as the optical modulator 400 according to the second embodiment and the optical modulation module 500 according to the third embodiment described above, it is possible to achieve a modulation operation driven at a lower voltage with appropriate optical characteristics such as an extinction ratio as compared with the related art, and to achieve appropriate optical transmission.

The present invention is not limited to the configuration of the above-described embodiment and its alternative configuration, and can be implemented in various embodiments without departing from the gist thereof.

For example, in the optical modulation element 100 according to the first embodiment, the conductor pattern 150 is formed in isolation on the substrate 102. Meanwhile, the conductor pattern 150 may not be necessarily formed in isolation. For example, the conductor pattern 150 may be formed so as to cover a plurality of regions on the substrate 102 through which unnecessary light propagates.

Further, for example, unlike the working electrode 114, the wiring electrode 118 which does not need to be formed close to the parallel waveguide 112 may be configured with the same base layer and conductive layer as the conductor pattern 150, and these wiring electrodes 118 and the conductor pattern 150 may be simultaneously formed on the substrate 102 in the same electrode forming step. Further, in this case, at least some of these wiring electrodes 118 and the conductor pattern 150 can be formed as a continuous pattern.

Further, in the optical modulation element 100 illustrated in FIG. 1, the paths of the wiring electrode 118 and the wiring of the bias electrodes 132*a*, 132*b*, and 132*c* (hereinafter, bias electrode wiring) are not limited to the paths illustrated in FIG. 1. The paths of the wiring electrode 118 and the bias electrode wiring on the substrate 102 are any paths as long as the paths do not act on the optical waveguide 104, based on the related art. For example, the wiring electrode 118 may be extended linearly from the signal electrode 114-1 so as not to act on the optical waveguide 104. Further, the bias electrode wiring may be formed by any path so as to reach the side 140*b* facing the side 140*a* on which the input waveguide 106 and the output waveguides 126*a* and 126*b* are formed, for example.

Further, in the optical modulation element 100 according to the first embodiment, as illustrated in FIG. 2, the working electrode 114 includes the first base layer 160 and the first conductive layer 162, but the embodiment is not limited thereto. The working electrode 114 may have a multi-stage structure having a third base layer made of a third material different from the first material and a third conductive layer on the third base layer, on an upper portion of the first conductive layer 162. Thus, an impedance of the working electrode 114 can be set within a predetermined range while matching a speed of the electrical signal propagating through the working electrode 114 with a speed of the light wave propagating through the optical waveguide 104.

Figure 12:
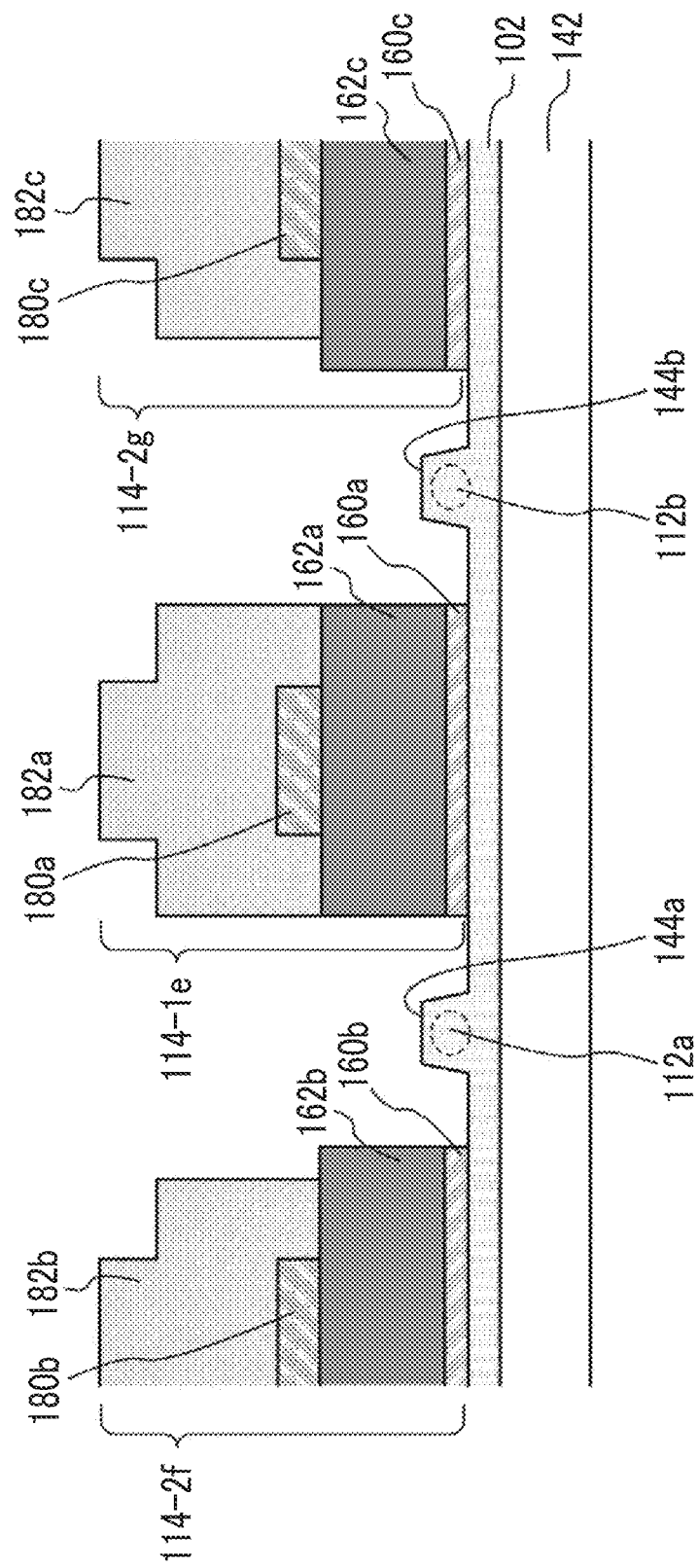
FIG. 12 is a diagram illustrating a modification example of the working electrode illustrated in FIG. 2.

For example, the signal electrodes 114-1*a* and the ground electrodes 114-2*a* and 114-2*b* illustrated in FIG. 2 can be configured as a signal electrodes 114-1*e* and ground electrodes 114-2*f* and 114-2*g* illustrated in FIG. 12, respectively. In FIG. 12, the signal electrode 114-1*e* includes the first base layer 160*a* and the first conductive layer 162*a*, and a third base layer 180*a* and a third conductive layer 182*a* on the first conductive layer 162*a*. Further, the ground electrode 114-2*f* includes the first base layer 160*b* and the first conductive layer 162*b*, and a third base layer 180*b* and a third conductive layer 182*b* on the first conductive layer 162*b*. In the same manner, the ground electrode 114-2*g* includes the first base layer 160*c* and the first conductive layer 162*c*, and a third base layer 180*c* and a third conductive layer 182*c* on the first conductive layer 162*c*. Hereinafter, the third base layers 180*a*, 180*b*, and 180*c* are collectively referred to as third base layers 180, and the third conductive layers 182*a*, 182*b*, and 182*c* are collectively referred to as third conductive layers 182.

In the configuration illustrated in FIG. 12, an end portion of the third base layer 180 is covered with the third conductive layer 182, in a cross-section perpendicular to an extending direction of the parallel waveguide 112, so that it is possible to prevent the third base layer 180 from being over-etched in an etching process at the time of electrode formation. The configuration in which the working electrode 114 is multi-staged in this manner is not limited to the configuration of the first base layer 160 and the first conductive layer 162 as illustrated in FIG. 12, and as illustrated in FIG. 6, FIG. 7, or FIG. 8, the configuration can also be applied in a configuration in which the base layer of the working electrode 114 is formed at both the first base layer 160 and the second base layer 164.

Further, in the first embodiment, as an example of the optical waveguide device according to the present invention, the optical modulation element 100 configured with the substrate 102 which is LN (LiNbO$_3$) is illustrated. Meanwhile, the optical waveguide device according to the present invention is not limited thereto. The optical waveguide device can be an element having any function (optical modulation, optical switch, optical directional coupler, or the like) including a substrate of any material (LN, InP, Si, or the like). Such an element can be, for example, a so-called silicon photonics waveguide device.

Further, in the above-described embodiment, the substrate 102 is, for example, an X-cut (substrate normal direction is X-axis of crystal axis) LN substrate (so-called X-plate). Meanwhile, a Z-cut LN substrate can also be used as the substrate 102.

As described above, the optical modulation element 100, which is an optical waveguide device according to the above-described first embodiment, has the substrate 102, the optical waveguide 104 formed on the substrate 102, and the working electrode 114 that controls a light wave propagating through the parallel waveguide 112 of the optical waveguide 104. The working electrode 114 includes the first base layer 160 made of a first material and the first conductive layer 162 on the first base layer 160. Then, in the region on the substrate 102, the conductor pattern 150 including the second base layer 164 made of a second material different from the first material and the second conductive layer 166 on the second base layer 164 can be formed, in a region other than a path from the input end to the output end of the optical waveguide 104.

Specifically, in the optical modulation element 100, the conductor pattern 150 including the second base layer 164 made of the second material different from the first material and the second conductive layer 166 on the second base layer 164 is formed, in a region in which unnecessary light that is controlled by the working electrode 114 and does not contribute to output light output from the substrate 102 propagates.

With these configurations, it is possible to effectively remove unnecessary light propagating in the substrate 102 while suppressing a light absorption loss that may occur due to the working electrode 114. As a result, it is possible to achieve the optical modulation element 100 which can be driven at a lower voltage with appropriate optical characteristics as compared with the related art.

Further, the second material constituting the second base layer 164 has a light absorption coefficient at a wavelength of light propagating through the optical waveguide 104, which is larger than a light absorption coefficient at the wavelength of the light of the first material constituting the first base layer 160. With this configuration, the unnecessary light propagating in the substrate 102 can be removed more effectively.

Further, the conductor pattern 150 may be a pattern continuous from the wiring electrode 118 connected to the working electrode 114. With this configuration, the conductor pattern 150 can be formed at the same time as the wiring electrode 118 is formed, so that a manufacturing step of the optical modulation element 100 is simplified.

Further, the optical waveguide 104 includes the nest-shaped Mach-Zehnder type optical waveguide 108 and the Mach-Zehnder type optical waveguide 110, and the radiated light beam waveguide 130 is provided at the Y-branch coupler 128 of these Mach-Zehnder type optical waveguides. Then, the conductor pattern 150 is disposed so as to cover at least a part of the radiated light beam waveguide 130. With this configuration, radiated light, which is unnecessary light propagating through the radiated light beam waveguide, can be effectively removed by the conductor pattern 150.

Further, the first conductive layer 162 and the second conductive layer 166 are made of gold (Au), and the first material constituting the first base layer 160 and the second material constituting the second base layer include a material that does not react with iodine. With this configuration, an iodine-based etching solution can be used for patterning the first conductive layer 162 and the second conductive layer 166 in a manufacturing process of the optical modulation element 100, so that the choice of etching solution in the manufacturing process is expanded, and the optical modulation element 100 can be easily manufactured.

In addition, the first material constituting the first base layer 160 is, for example, niobium (Nb), and the second material constituting the second base layer 164 is, for example, titanium (Ti). With this configuration, it is possible to achieve the optical modulation element 100 which can be driven at a lower voltage with appropriate optical characteristics without using a special material, as compared with the related art.

The thickness of the first base layer 160 is equal to or lower than 30 nm, and the thickness of the second base layer 164 is equal to or higher than 100 nm. With this configuration, it is possible to more easily achieve the optical modulation element 100 which can be driven at a lower voltage with appropriate optical characteristics as compared with the related art.

The optical waveguide 104 is a protruding optical waveguide including the protruding portion 144 extending on the substrate 102. With this configuration, it is possible to achieve the optical modulation element 100 which can be driven at a lower voltage with appropriate optical characteristics as compared with the related art.

Further, the optical modulation element 100 has the two working electrodes 114 (specifically, the signal electrode 114-1 and the ground electrode 114-2) sandwiching the parallel waveguide 112 of the optical waveguide 104 in the plane of the substrate 102. A gap of these two working electrodes 114 is equal to or higher than 1.0 μm and equal to or lower than 5.0 μm. With this configuration, it is possible to easily achieve the optical modulation element 100 which can be driven at a lower voltage with appropriate optical characteristics as compared with the related art.

Further, the working electrode 114 has the third base layer made of the third material different from the first material and the third conductive layer on the third base layer, on the first conductive layer 162. Then, in a cross-section perpendicular to an extending direction of the optical waveguide 104, the end portion of the third base layer is covered with the third conductive layer.

Further, the third material is made of titanium (Ti), and the third conductive layer is made of gold (Au).

With these configurations, it is possible to prevent the third base layer from being over-etched in the etching process at a time of electrode formation.

Further, the optical modulator 400 according to the second embodiment includes the optical modulation element 100 that modulates light, the case 402 that houses the optical modulation element 100, the input optical fiber 414 through which the light is input to the optical modulation element 100, and the output optical fiber 420 that guides the light output from the optical modulation element 100 to the outside of the case 402.

Further, the optical modulation module 500 according to the third embodiment includes the optical modulation element 100, the case 402 that houses the optical modulation element 100, the input optical fiber 414 that inputs light to the optical modulation element 100, the output optical fiber 420 that guides the light output from the optical modulation element 100 to the outside of the case 402, and the drive circuit 508 that drives the optical modulation element.

Further, the optical transmission apparatus 600 according to the fourth embodiment includes the optical modulator 400 according to the second embodiment or the optical modulation module 500 according to the third embodiment, and the modulation signal generation part 608 which is an electronic circuit that generates an electrical signal for causing the optical modulation element 100 to perform a modulation operation.

With these configurations, it is possible to achieve the optical modulator 400, the optical modulation module 500, or the optical transmission apparatus 600 which can be driven at a lower voltage with appropriate optical characteristics as compared with the related art.

What is claimed is:
1. An optical waveguide device comprising:
   a substrate;
   an optical waveguide formed on the substrate; and
   a working electrode that controls a light wave propagating through the optical waveguide, the working electrode including a signal electrode and a ground electrode that sandwich a parallel waveguide of the optical waveguide in a plane of the substrate, and the working electrode includes-including a first base layer made of a first material, and a first conductive layer on the first base layer,layer; and
   a plurality of conductor patterns not connected to the working electrode formed in a region other than a path from an input end to an output end of the optical waveguide, in a region of the substrate,
   wherein
   the optical waveguide includes:
      a first nest-shaped Mach-Zehnder type optical waveguide including a first Mach-Zehnder type optical waveguide; and
      a second Mach-Zehnder type optical waveguide,
   at a first Y-branch coupler that is a Y-branch coupler of the first nest-shaped Mach-Zehnder type optical waveguide, a first radiated light beam waveguide is provided to propagate a radiated light beam leaking from the first nest-shaped Mach-Zehnder type optical waveguide without being combined,
   the plurality of conductor patterns include a second base layer made of a second material different from the first material and a second conductive layer on the second base layer, and
   the plurality of conductor patterns include a first conductor pattern that is disposed to cover at least a part of the first radiated light beam waveguide in a vicinity of an output end of an output waveguide which is an output end of a signal light.
2. The optical waveguide device according to claim 1,
   wherein the plurality of conductor patterns including the second base layer and the second conductive layer is formed in a region of the substrate in which unnecessary light propagates, the unnecessary light being light that does not contribute to output light that is controlled by the working electrode and that is output from the optical waveguide to an outside of the substrate.

3. The optical waveguide device according to claim 1, wherein the second material has a light absorption coefficient at a wavelength of light propagating through the optical waveguide, which is larger than a light absorption coefficient of the first material at the wavelength of the light.

4. The optical waveguide device according to claim 1, wherein the first conductive layer and the second conductive layer are made of gold (Au), and the first material and the second material include a material that does not react with iodine.

5. The optical waveguide device according to claim 1, wherein the first material is niobium (Nb), and the second material is titanium (Ti).

6. The optical waveguide device according to claim 5, wherein a thickness of the first base layer is equal to or lower than 30 nm, and
a thickness of the second base layer is equal to or higher than 100 nm.

7. The optical waveguide device according to claim 1, wherein the optical waveguide is a protruding optical waveguide including a protruding portion extending on the substrate.

8. The optical waveguide device according to claim 7, wherein
a gap between the signal electrode and the ground electrode is equal to or higher than 1.0 μm and equal to or lower than 5.0 μm.

9. The optical waveguide device according to claim 1, wherein the working electrode has a third base layer made of a third material different from the first material and a third conductive layer on third base layer, on the first base layer, and
an end portion of the third base layer is covered with the third conductive layer, in a cross-section perpendicular to an extending direction of the optical waveguide.

10. The optical waveguide device according to claim 9, wherein the third material is made of titanium (Ti), and the third conductive layer is made of gold (Au).

11. An optical modulator comprising:
the optical waveguide device according to claim 1, which is an optical modulation element that modulates light;
a case that houses the optical waveguide device;
an optical fiber through which light is input to the optical waveguide device; and
another optical fiber that guides light output by the optical waveguide device to an outside of the case.

12. An optical transmission apparatus comprising:
the optical modulator according to claim 11; and
an electronic circuit that generates an electrical signal for causing the optical waveguide device to perform a modulation operation.

13. An optical modulation module comprising:
the optical waveguide device according to claim 1, which is an optical modulation element that modulates light;
a case that houses the optical waveguide device;
an optical fiber through which light is input to the optical waveguide device;
another optical fiber that guides light output by the optical waveguide device to an outside of the case; and
a drive circuit that drives the optical waveguide device.

14. An optical transmission apparatus comprising:
the optical modulation module according to claim 13; and
an electronic circuit that generates an electrical signal for causing the optical waveguide device to perform a modulation operation.

15. The optical waveguide device according to claim 1, wherein
at a second Y-branch coupler that is a Y-branch coupler of the first Mach-Zehnder type optical waveguide and the second Mach-Zehnder type optical waveguide, a second radiated light beam waveguide is provided to propagate a radiated light beam leaking from the first Mach-Zehnder type optical waveguide and the second Mach-Zehnder type optical waveguide without being combined, and
the plurality of conductor patterns include a second conductor pattern that is disposed to cover at least a part of the second radiated light beam waveguide.

16. The optical waveguide device according to claim 15, wherein the optical waveguide includes:
a second nest-shaped Mach-Zehnder type optical waveguide including a third Mach-Zehnder type optical waveguide, and
a fourth Mach-Zehnder type optical waveguide,
the first nest-shaped Mach-Zehnder type optical waveguide and the second nest-shaped Mach-Zehnder type optical waveguide are arranged side by side along a direction of the path, and
the plurality of conductor patterns include a third conductor pattern that is disposed to cover at least a part of a third radiated light beam waveguide that is provide at a second Y-branch coupler that is a Y-branch coupler of the second nest-shaped Mach-Zehnder type optical waveguide.

17. The optical waveguide device according to claim 16, wherein
at a third Y-branch coupler that is a Y-branch coupler of the third Mach-Zehnder type optical waveguide and the fourth Mach-Zehnder type optical waveguide, a third radiated light beam waveguide is provided to propagate a radiated light beam leaking from the third Mach-Zehnder type optical waveguide and the fourth Mach-Zehnder type optical waveguide without being combined, and
the plurality of conductor patterns include a fourth conductor pattern that is disposed to cover at least a part of the third radiated light beam waveguide.

18. The optical waveguide device according to claim 1, wherein the optical waveguide includes:
a second nest-shaped Mach-Zehnder type optical waveguide including a third Mach-Zehnder type optical waveguide; and
a fourth Mach-Zehnder type optical waveguide, the first nest-shaped Mach-Zehnder type optical waveguide and the second nest-shaped Mach-Zehnder type optical waveguide are arranged side by side along a direction of the path, and
the plurality of conductor patterns include a third conductor pattern that is disposed to cover at least a part of a third radiated light beam waveguide that is provide at a second Y-branch coupler that is a Y-branch coupler of the second nest-shaped Mach-Zehnder type optical waveguide.

19. The optical waveguide device according to claim 18, wherein
at a third Y-branch coupler that is a Y-branch coupler of the third Mach-Zehnder type optical waveguide and the fourth Mach-Zehnder type optical waveguide, a third radiated light beam waveguide is provided to propagate a radiated light beam leaking from the third Mach-Zehnder type optical waveguide and the fourth Mach-Zehnder type optical waveguide without being combined, and the plurality of conductor patterns include a fourth conductor pattern that is disposed to cover at least a part of the third radiated light beam waveguide.

20. The optical waveguide device according to claim 18, wherein
the plurality of conductor patterns include a fifth conductor pattern that is disposed in a vicinity of an input end of the optical waveguide, and
the first conductor pattern, the third conductor pattern, and the fifth conductor pattern are disposed on a same side of the substrate.

21. The optical waveguide device according to claim 1, wherein
the plurality of conductor patterns include a fifth conductor pattern that is disposed in a vicinity of an input end of the optical waveguide, and
the first conductor pattern and the fifth conductor pattern are disposed on a same side of the substrate.

\* \* \* \* \*